Feb. 24, 1925.
J. J. NIEDERKORN
1,527,817
STRAW GUIDE FOR THRASHING MACHINES
Filed July 28, 1923 2 Sheets-Sheet 1
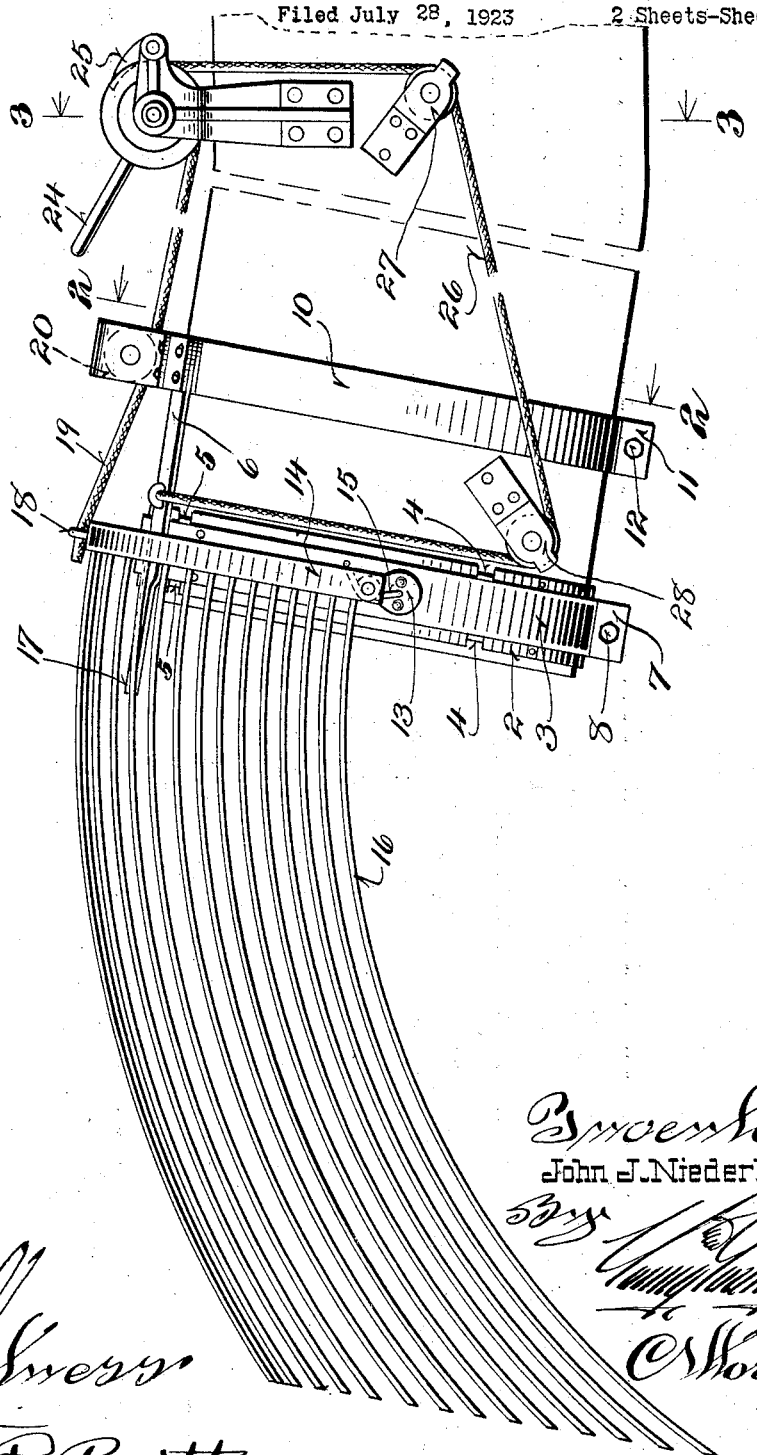

Feb. 24, 1925. 1,527,817
J. J. NIEDERKORN
STRAW GUIDE FOR THRASHING MACHINES
Filed July 28, 1923   2 Sheets-Sheet 2
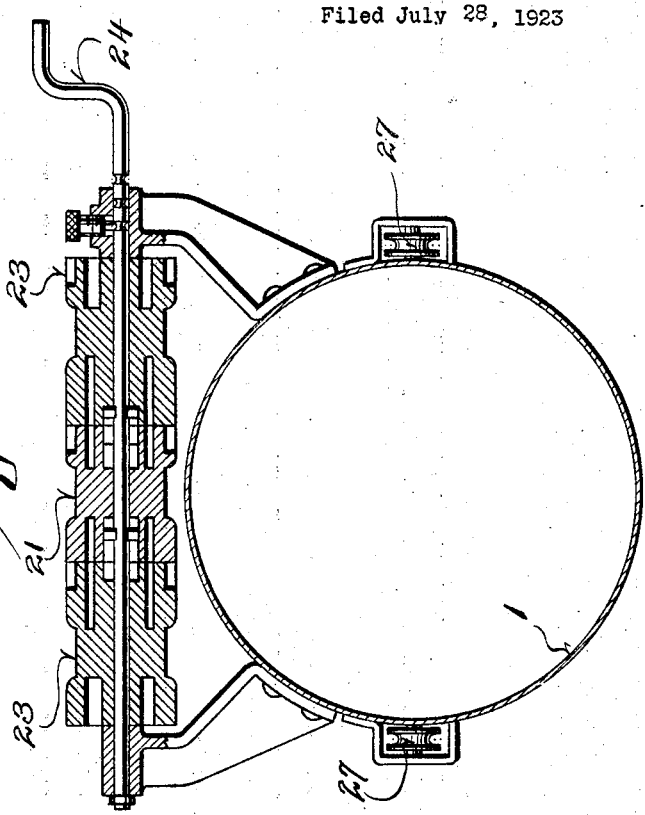
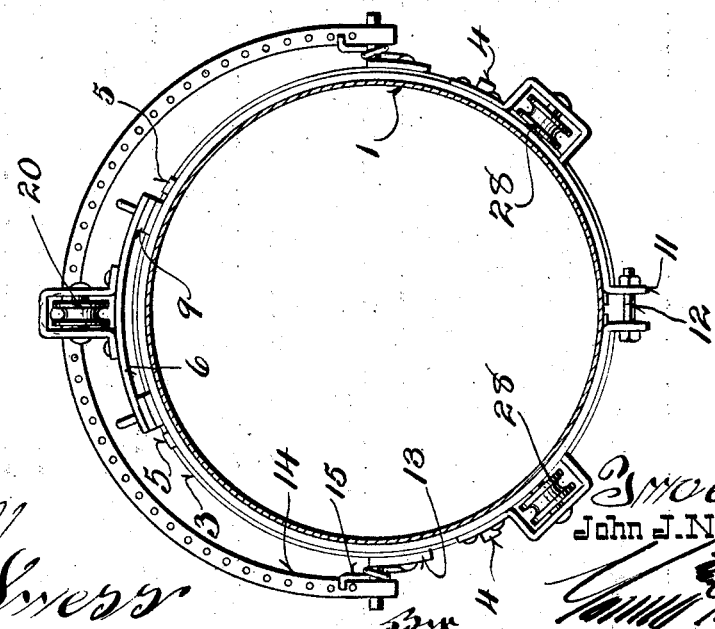

Patented Feb. 24, 1925.

1,527,817

UNITED STATES PATENT OFFICE.

JOHN J. NIEDERKORN, OF PORT WASHINGTON, WISCONSIN.

STRAW GUIDE FOR THRASHING MACHINES.

Application filed July 28, 1923. Serial No. 654,381.

*To all whom it may concern:*

Be it known that I, JOHN J. NIEDERKORN, a citizen of the United States, and resident of Port Washington, in the county of Ozaukee and State of Wisconsin, have invented certain new and useful Improvements in Straw Guides for Thrashing Machines; and I do hereby declare that the following is a full, clear, and exact description thereof.

This invention relates to straw guides for thrashing machines, and is particularly directed to a straw guide adapted to be attached to the ordinary type of blower pipe of thrashing machine.

In thrashing machines, as previously constructed, it is found that the straw is blown from the blower pipe directly into a pile of discharged material. The consequence of this is that the powerful draft from the blower pipe causes the straw to scatter and to form an irregular pile. It is also found that considerable dirt and dust is blown directly into the pile and is mixed with the straw. This invention is designed to overcome the above noted defects, and objects of such invention are to provide a straw guide for the blower pipe of thrashing machines which is so constructed that it will direct the straw to the exact point desired without scattering the pile of straw by the blast from the blower pipe, which is adjustable and is adapted to direct the straw in any desired direction, in which the adjusting means may be operated from a point remote from the end of the blower pipe, and in which the straw is held for a second in its passage from the pipe and the dust and dirt blown directly away from the straw thus providing means for cleaning the straw prior to depositing it into the pile.

This invention is an improvement over that disclosed in my copending application for straw guides for thrashing machines, filed October 12, 1922, Serial No. 594,155, and has in general the same objects as those in such application.

An embodiment of the invention is shown in the accompanying drawings, in which:—

Figure 1 is a fragmentary view of the blower pipe of a thrashing machine equipped with a straw guide and the adjusting mechanism therefor.

Figure 2 is a sectional view on the line 2—2 of Figure 1, the cables being omitted for clearness.

Figure 3 is a sectional view on the line 3—3 of Figure 1, the cables in this view being also omitted for clearness.

The upwardly and outwardly extending blower pipe 1 of the thrashing machine is provided adjacent its outer end with a band 2 of sheet metal which is secured to such outer end in any suitable manner. This band band 2 reenforces the outer end and in addition thereto provides a guide for a strap 3 slidably carried by such band. A convenient way of retaining the strap 3 in position and permitting its sliding motion around the band 2 is by providing upturned lugs or ears 4 and 5 struck from the band 2, as may be seen from Figure 1. The ears 4 project outwardly a greater distance than the ears 5 and are adapted to contact with a curved strap 6 carried by the normally upper portion of the band 3. The band 3 may have its lower ends 7 connected by means of a bolt 8, as shown in Figure 1, to adjust the diameter of the band to the exact desired size. It is to be noted that the band 6 is spaced upwardly from the strap 3 by means of blocks or spacing members corresponding to the spacing members 9 (see Figure 2 hereinafter described) so that the band will freely ride over the lugs 5 and will contact with the lugs 4, such latter lugs, therefore, constitute stops to prevent further rotary motion of the band 3 with reference to the blower pipe 1. A second strap 10 is loosely positioned about the pipe 1 and is spaced rearwardly from the strap 3. It is similarly provided with ears 11 adjustably connected by means of a bolt 12. This band is connected with the band 3 by means of the curved strap 6. The band 6 is spaced from the strap 10 by means of spacing members 9 (see Figure 2) so that such curved strap parallels the outer surface of the blower pipe.

The band 3 is provided with brackets 13 upon opposite sides of the blower pipe when the device is in its assembled position and a U-shaped or semi-circular member 14 is pivotally carried by such brackets. This member is urged in a counter clockwise direction by means of the springs 15. The member 14, or U-shaped element, is provided with a plurality of curved straw guiding bars 16, as may be seen from Figure 1. These bars extend outwardly beyond the outer end of the blower pipe 1 and act to guide the projected straw into the desired position—the dirt and dust being blown directly outwardly from the guided straw while such straw rests upon the fingers or bars 16. The strap 6 is projected forwardly beyond the band 3 and provides an outwardly projecting portion 17. This portion is adapted to contact with the portion 14 and to limit its outward rocking action. An eyelet 18 is carried centrally of the U-shaped member 14 and is provided with a rearwardly extending rope 19. This rope is guided beneath the pulley 20 supported from the upper side of the strap 10, and preferably attached above the strap 6. The rope 19 passes to any suitable adjusting and locking means such for instance as that illustrated in Figure 3,—the rope in this case being connected to the central drum 21. Similar end drums 23 are provided and all of such drums may be selectively rotated by means of the crank 24 (see Figures 1 and 3)—suitable ratchet means 25 being provided for temporarily retaining the drums in their adjusted positions. The drums 23 are connected with the strap 6 by means of cables 26 which pass beneath guiding sheaves 27 and 28 thus providing a very serviceable and easily operated adjusting means.

It is to be noted that the adjusting crank 24 and the associated mechanism may be located at any point along the blower pipe 1 remote from its outer end and in a position easily accessible to the operator. This adjusting means is similar to that described in my above copending application and consists of a series of drums 21 and 23 which are selectively engaged by the shaft of the crank 24 and are held, as stated, in adjusted position by means of pawl and ratchet mechanism 25. However, it is to be distinctly understood that this particular means of adjustment may be varied and other means for operating the cables or ropes 19 and 26 may be employed if desired.

The operation of the apparatus is as follows:—The exact angle at which the fingers 16 are to project from the blower pipe 1 may be regulated by varying the pull upon the rope 19 thus rocking the U-shaped member 14 into any desired position. If it is desired to discharge the straw laterally from the end of the pipe 1, the appropriate cable 26 is tightened, thus drawing upon the connecting strap 6 and rotating the straps 3 and 10 about the pipe 1. This bodily carries the associated mechanism including the fingers 16 around the pipe and directs them laterally outwardly from the pipe at the exact position desired. This control of both the angular motion and the direction in which the fingers point may be had from a remote point, as is readily apparent from the disclosure and thus the building up of the pile of straw in the exact form desired may be most readily attained.

It will be seen that a straw guide for thrashing machines has been provided which is of extremely simple formation, which is of rugged construction, and which is effective in operation.

Although one form of the invention has been described in considerable detail, it is to be understood that the invention may be variously embodied and is, therefore, to be limited only as claimed.

I claim:

1. A straw guide for thrashing machines having a blower pipe comprising a band rigidly attached to the outer end of said pipe, guiding members projecting outwardly from said band, a second band slidably mounted upon said rigidly attached band and guided thereby, a third band positioned rearwardly and rigidly attached to said second band, means for rotating said second and third bands relative to said pipe, a U-shaped member having its ends pivoted upon opposite sides of said second band, a plurality of fingers projecting outwardly from said U-shaped member and across the front of said pipe, and means for rocking said U-shaped member, whereby the angular disposition of said fingers may be varied.

2. A straw guide for thrashing machines having a blower pipe comprising a guiding band rigidly attached adjacent the outer end of said pipe, a movable band encircling and guided by said first mentioned band, a second movable band spaced rearwardly of said first mentioned band, means rigidly connecting said movable bands, a U-shaped member straddling said first movable band and having its ends pivotally joined thereto upon opposite sides of such band, resilient means urging said U-shaped member outwardly, a cable extending rearwardly from said U-shaped member and adapted to draw such member inwardly, a plurality of straw guiding fingers projecting outwardly from and carried by said U-shaped member, a pair of guide sheaves secured upon opposite sides of said blower pipe, and a pair of cables extending over said sheaves and adapted to rotate said first and second mentioned movable bands about said pipe.

In testimony that I claim the foregoing I have hereunto set my hand at Port Washington, in the county of Ozaukee and State of Wisconsin.

JOHN J. NIEDERKORN.